United States Patent [19]

Satoh

[11] Patent Number: 4,527,686

[45] Date of Patent: Jul. 9, 1985

[54] SYSTEM FOR CORRECTING DEFLECTION OF BELT FROM ITS NORMAL PATH OF MOVEMENT

[75] Inventor: Tsumori Satoh, Yokosuka, Japan

[73] Assignee: Ricoh Co., Ltd., Japan

[21] Appl. No.: 459,795

[22] Filed: Jan. 21, 1983

[30] Foreign Application Priority Data

Jan. 21, 1982 [JP] Japan ............................... 57-6704[U]

[51] Int. Cl.³ ............................................ B65G 39/16
[52] U.S. Cl. ...................................... 198/807; 226/21; 355/3 BE; 474/102; 474/123
[58] Field of Search ....................... 198/807, 806, 808; 474/102, 103, 104, 123; 226/21, 22, 23; 355/3 BE

[56] References Cited

U.S. PATENT DOCUMENTS

| 2,630,319 | 3/1953 | Heilman et al. | 226/21 |
| 2,777,069 | 1/1957 | Saeman | 226/21 X |
| 3,543,597 | 12/1970 | Schamphelaere | 474/103 |
| 3,563,484 | 2/1971 | Bray | 226/22 |
| 3,715,027 | 2/1973 | Fujimoto | 198/806 |
| 4,173,904 | 11/1979 | Repetto | 198/807 X |
| 4,483,607 | 11/1984 | Nagayama | 355/3 BE X |

Primary Examiner—Joseph E. Valenza
Assistant Examiner—Jonathan D. Holmes
Attorney, Agent, or Firm—Guy W. Shoup

[57] ABSTRACT

A system for correcting deflection of a belt from its normal path of movement, the belt being trained over a plurality of rollers for movement in a predetermined direction, including optical sensors for sensing a deflection of the belt in one direction, and a center axis displacing mechanism including a cam for obtaining a displacement of at least one of the rollers.

5 Claims, 5 Drawing Figures

SYSTEM FOR CORRECTING DEFLECTION OF BELT FROM ITS NORMAL PATH OF MOVEMENT

BACKGROUND OF THE INVENTION

This invention relates to systems for correcting deflection from a normal path of movement of a belt trained over a plurality of rollers, and more particularly it is concerned with a belt deflection correcting system of the type described which is suitable for use with a belt conveyor device using a conveyor belt or a copying apparatus using a photosensitive belt.

Various type of systems have hitherto been available for correcting deflection of a belt from its normal path of movement. In all these systems, the belt is forcedly returned to the left or the right depending on the direction of deflection thereof. For moving the belt in the desired direction, a belt supporting roller is usually tilted with respect to its center axis. Japanese Utility Model Application Laid-Open No. Sho-56-20405 discloses a system for correcting deflection of a belt from its normal path of movement by tilting the center axis of a roller. In the system disclosed, a sensing plate is arranged along either side edge of the belt in a position in which the sensing plate is brought into contact with the respective side edge of the belt, and the sensing plates are connected together by a connecting rod, so that when the belt is deflected from its normal path of movement in one direction, the side edge of the belt is brought into contact with the sensing plate located on the side toward which the belt is deflected. As further deflection of the belt causes the sensing plate and the connecting rod to move, a switch located in a suitable position is actuated to render operative a hydraulic cylinder connected to one end of the support shaft of the roller. The hydraulic cylinder causes the center axis of the roller to tilt, to thereby move the belt in a direction opposite the direction of its deflection to allow it to move along its normal path of movement.

Some disadvantages are associated with this system. Since the belt is brought at its side edges into contact with the sensing plates, the side edges of the belt might suffer damage. Also, when the side edges of the belt are not straight, the movement of the sensing plates coming into contact with the side edges of the belt would be unstable, so that misoperation of the hydraulic cylinder might result. When the belt undergoes vibration, misoperation of the hydraulic cylinder might occur.

In case that the switch is actuated by the movement of the sensing plate, the switch would not essentially be actuated unless the deflection of the belt exceeds a predetermined amount. Thus tilting of the shaft of the roller in response to a deflection of the belt would be delayed, making it impossible to correct a belt deflection occurring in a small amount.

SUMMARY OF THE INVENTION

This invention has been developed for the purpose of obviating the aforesaid disadvantages of the prior art. Accordingly the invention has as its object the provision of a system for correcting deflection of a belt from its normal path of movement capable of achieving a correction of the belt deflection with a high degree of accuracy and precision without incurring a loss of power of an excessive amount and without in any way damaging the belt.

The aforesaid object can be accomplished by providing optical sensor means located in the vicinity of one side edge of the belt for sensing a deflection of the belt, and cam means for tilting the roller to move the belt in a direction opposite the direction of its deflection.

DESCRIPTION OF THE PREFERRED EMBODIMENTS

Figure 1:
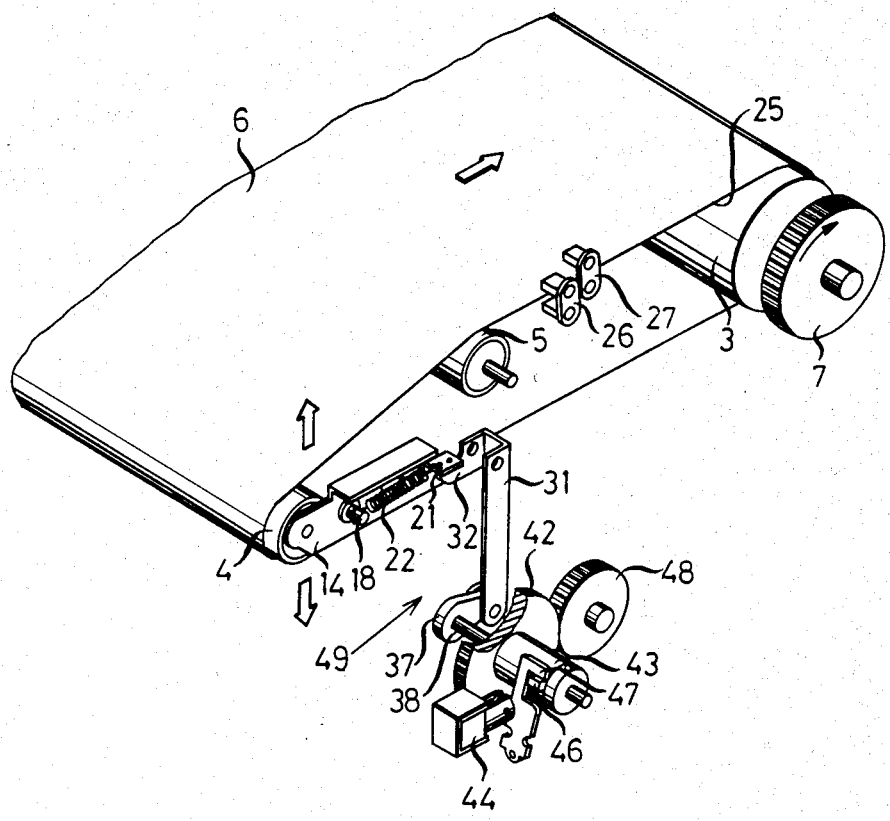
FIG. 1 is a perspective view of the system for correcting deflection of a belt from its normal path of movement comprising a first embodiment of the invention.

A first embodiment of the invention will be described by referring to FIGS. 1 and 2. Mounted between a pair of belt unit side plates 1 and 2 (FIG. 2) spaced apart from each other a predetermined distance are a drive roller 3, a tension roller 4 and an auxiliary roller 5 (FIG. 1) arranged parallel to one another and an endless belt 6 trained over the rollers 3, 4 and 5. A gear 7 is secured to one end of the drive roller 3, and the auxiliary roller 5 has secured to opposite ends thereof rings 8 fitted over a shaft 10 connected to a bracket 9 secured to the side plate 1. Only one ring 8 is shown. The tension roller 4 also has rings 11 secured to opposite ends thereof, one of the rings 11 being fitted over a shaft 13 connected to a support plate 12 secured to the side plate 2 and the other ring 11 being fitted over a shaft 15 connected to a movable plate 14 secured to the side plate 1. The movable plate 14 is formed with a slot 16 having a major axis extending longitudinally of the plate 14 through which a fixed shaft 18 extends, and a relief opening 17 of a relatively large size having inserted a screw 20 with a large head 19. The movable plate 14 is formed with a horizontal portion 21 having secured thereto one end of a tension spring 22 secured at the other end thereof to the fixed shaft 18 to normally urge the movable plate 14 leftwardly. A compression spring 24 is mounted between a projection 23 of the side plate 1 and the horizontal portion 21 of the movable plate 14 to urge the movable plate 14 to move clockwise.

Two sensors 26 and 27 are mounted on the side plate 1, each having a light emitting section and a light receiving section located above and below a side edge portion of the belt 6. The sensors 26 and 27 are vertically displaced from each other with respect to a side edge 25 of the belt 6.

Figure 3:
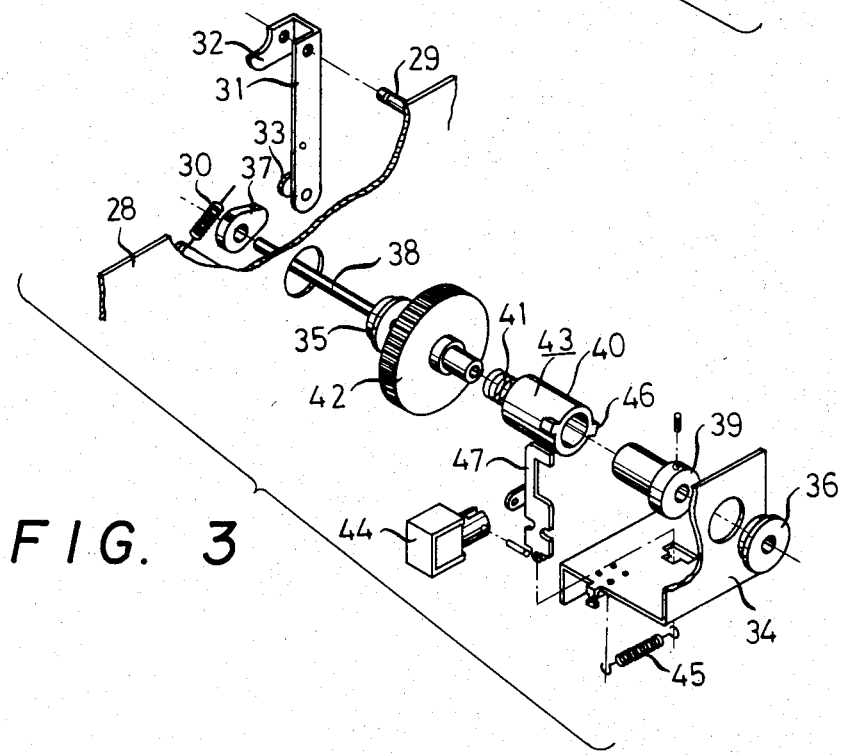

A main body side plate 28 is mounted parallel to the side plate 1 as shown in FIG. 3 and has a shaft 29 secured thereto which supports a cam lever 31 urged to move clockwise by a tension spring 30 for pivotal movement. The cam lever 31 has an actuator 32 adapted to come into engagement with the underside of the horizontal member 21 of the movable plate 14, and has a contact pin 33 secured to its lower end.

A support plate 34 is attached to the main body side plate 28, and bearings 35 and 36 are coaxially mounted on the side plate 28 and the support plate 34 respectively for journalling a cam shaft 38 having secured thereto a cam 37 coming into contact with the contact pin 33 of the cam lever 31. The cam shaft 38 has mounted thereon a half-circle rotation spring clutch 43 comprising a fixed boss 39, a tubular shaft 40, a spring 41 and a drive member 42. Mounted on the support plate 34 is a solenoid 44 having connected thereto a clutch pawl 47 urged by a tension spring 45 to move in a direction in which it is brought into engagement with a projection 46 of the tubular shaft 40. The drive member 42 has a drive gear 48 in meshing engagement therewith as shown in FIG. 1.

The half-circle rotation spring clutch 43, cam 37, cam lever 31 and movable plate 43 constitute center axis displacing means 49.

In the aforesaid construction, the cam 37 rotates through a half-circle and becomes stationary each time it rotates. During rotation of the cam 37, the cam lever 31 pivotally moves clockwise or counterclockwise along an outer periphery of the cam 37, so that the position of the cam lever 31 is decided by a point in time at which the cam 37 becomes stationary. Thus pivotal movement of the cam lever 31 causes changes to occur in the position of the actuator 32 which cause the movable plate 14 to rotate counterclockwise or clockwise about the fixed shaft 18. This results in the position of the support shaft 15 moving vertically to move the tension roller 4 in pivotal movement about a portion thereof on the side of the support shaft 13. Assume that the cam lever 31 is in contact with a lower portion of the cam 37. Then the portion of the tension roller 4 on the side of the support shaft 15 is located in a lower position. Thus the belt 6 tends to be deflected in serpentine movement from its normal path of movement rightwardly with respect to the normal direction of its movement until the side edge 25 of the belt 6 is sensed by the sensor 26 further from the belt 6 than the sensor 27. The sensor 26 sensing the side edge 25 produces a signal which energizes the solenoid 44, with the result that the clutch pawl 47 is released from engagement with the projection 46 to allow the tubular shaft 40 to rotate through a half-circle. The rotation of the tubular shaft 40 is transmitted through the spring 41 and fixed boss 39 to the cam shaft 38, to thereby cause the cam 37 to rotate through a half-circle. This moves the cam lever 31 counterclockwise in pivotal movement, and the movable plate 14 is rotated clockwise by the biasing force of the compression spring 24, to thereby move the support shaft 15 upwardly. This urges the belt 6 to move leftwardly in serpentine movement with respect to the direction of its movement, until the sensor 27 senses the side edge 25 of the belt 6.

Thus the belt 6 is moved rightwardly or leftwardly depending on the direction of inclination of the tension roller 4, and the range of inclination may vary depending on the spacing between the sensors 26 and 27. The center axis displacing means 49 is highly sensitive because it sets the direction of serpentine movement of the belt 6 each time the cam 37 rotates through a half-circle. Since the sensors 26 and 27 are optical sensor means, they can be mounted along one side of the belt 6, so that they can be used with a belt of large width.

Figure 2:
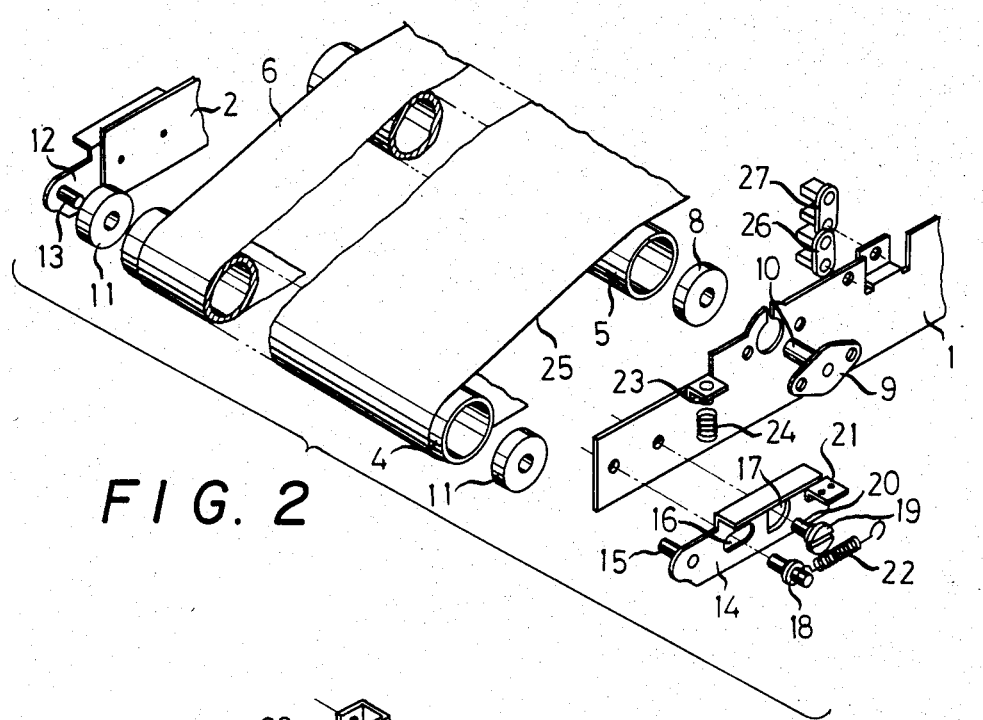
FIGS. 2 and 3 are exploded perspective views of the embodiment shown in FIG. 1.
Figure 4:
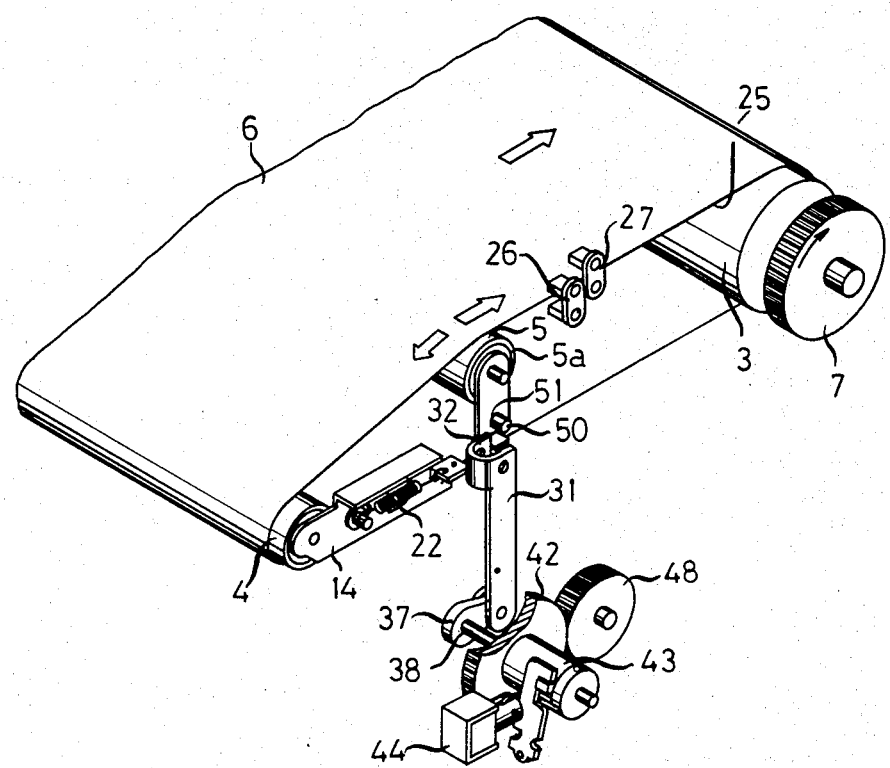
FIG. 4 is a perspective view of the system for correcting deflection of a belt from its normal path of movement comprising a second embodiment of the invention.

A second embodiment will be described by referring to FIG. 4 wherein parts similar to those shown in FIGS. 1-3 are designated by like reference characters and their description will be omitted. In this enbodiment, the tension roller 4 is merely biased in a tension imparting direction, and the auxiliary roller 5 is supported as one end 5a thereof by a bracket 51 pivotally movable about a shaft 50. The bracket 51 has the actuator 32 of the cam lever 31 in engagement therewith.

In the aforesaid construction, the end 5a of the auxiliary roller 5 tilts either in an advancing direction or a delaying direction with respect to the normal direction of movement of the belt 6 depending on the position of the cam 37. When the end 5a tilts in the advancing direction, the end 5a moves in the normal direction of the belt, when it tilts in the delaying direction, it moves in a direction opposite the direction of normal movement of the belt 6, thereby deciding the direction of serpentine movement of the belt 6.

Figure 5:
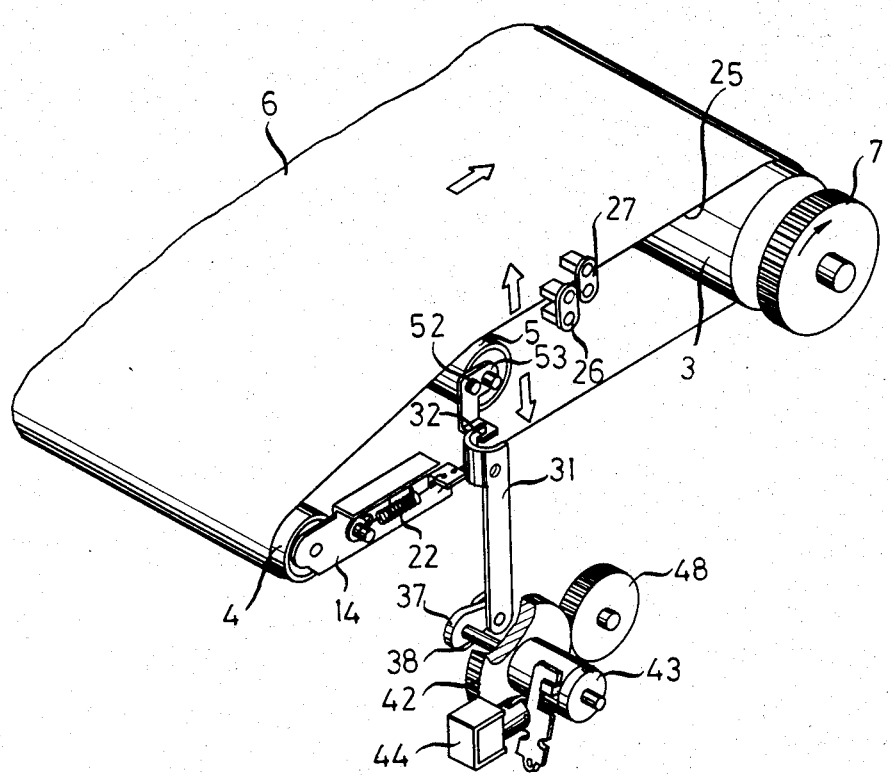
FIG. 5 is a perspective view of the system for correcting deflection of a belt from its normal path of movement comprising a third embodiment of the invention.

FIG. 5 shows a third embodiment wherein the auxiliary roller 5 is supported by a bracket 53 which in turn is supported by a pin 52. The bracket 53 being in the form of a letter L, one end of the auxiliary roller 5 moves vertically, in the same manner as described by referring to the first embodiment, except that the two embodiments differ from each other in that the vertically moving element is the auxiliary roller 5 in the third embodiment but it is the tension roller 4 in the first embodiment.

From the foregoing description, it will be appreciated that in the present invention, one of the rollers over which the endless belt is trained is mounted in a manner to have its center axis displaced to allow the belt to move leftwardly or rightwardly. The direction in which the belt is displaced is predetermined and sensing of the displaced belt is performed by the optical sense means. This allows deflection of a belt of a very large width from its normal path of movement to be corrected by the system according to the invention because the range of displacements of the belt can be set only on one side thereof and thus the risks of damaging the belt are minimized. The use of the center axis displacing means including a cam for switching the directions of serpentine movement offers the advantages that a quick response can be obtained, the operation is reliable, and no drive force is required after the switching is effected.

What is claimed is:

1. A system for correcting deflection of a belt from its normal path of movement, wherein a deflection in one direction of the belt trained over a plurality of rollers for movement in a predetermined direction is corrected, at least one of said plurality of rollers being displaceable transversely to its center axis in a manner to allow the moving belt to move rightwardly or leftwardly with respect to the direction of movement of the belt, comprising:

(a) sensor means located along one side edge of said belt for sensing one side edge portion of said belt as it reaches a predetermined leftward or rightward position and producing a corresponding signal;

(b) a movable plate with a shaft means supporting said at least one roller at one end thereof for rotation and being able to move in pivotal movement between one position at which said one roller deflects said belt to one direction of leftward or rightward and another position at which said one roller deflects said belt to the other direction in accordance with said signal;

(c) a cam rotatably mounted to effect pivotal movement of said movable plate; and (d) a spring clutch connecting said cam to a drive member, causing said cam to rotate through a predetermined angle by a signal produced by said sensor means to displace said movable plate to a corresponding one of positions, and then keeping said cam stationary in that condition till a next signal is produced by said sensor means.

2. A system for correcting deflecting of a belt from its normal path of movement as claimed in claim 1, wherein said movable plate is pivotally supported by a support shaft to allow said end of said at least one roller to be vertically displaced, and a cam lever in engagement with one portion of said movable plate and supported by a suitable support shaft for pivotal movement thereabout to allow said movable plate to pivot, said cam causing said cam lever to move in pivotal movement.

3. A system for correcting deflection of a belt from its normal path of movement as claimed in claim 1, wherein said center axis displacing means further comprises a cam lever in engagement with a portion of said movable plate and supported by a suitable shaft for pivotal movement thereabout to allow said movable plate to pivot, said cam causing said cam lever to move in pivotal movement.

4. A system for correcting deflection of a belt from its normal path of movement as claimed in claim 1, wherein said sensor means comprises a plurality of optical sensors, one of said plurality of optical sensors being arranged along said one side edge of said belt, and the other optical sensor being located in a position further from said one side edge of said belt than said one optical sensor.

5. The deflection correction system of claim 1, wherein a cam lever is mounted between the cam and the movable plate for pivotal movement about a shaft by the movement of said cam to pivot said movable plate.

* * * * *